(12) United States Patent
Bonazza et al.

(10) Patent No.: US 7,396,466 B2
(45) Date of Patent: Jul. 8, 2008

(54) METHOD AND SYSTEM FOR FILTRATION OF WASTEWATER

(75) Inventors: Joseph M. Bonazza, Tarentum, PA (US); Donald J. McCarty, Elizabethtown, PA (US); Navin Kadakia, Bridgeville, PA (US); David C. Slack, Tampa, FL (US)

(73) Assignee: Tetra Process Technologies Seven Trent Services Company, Tampa, FL (US)

( * ) Notice: Subject to any disclaimer, the term of this patent is extended or adjusted under 35 U.S.C. 154(b) by 134 days.

(21) Appl. No.: 10/554,803

(22) PCT Filed: Apr. 29, 2004

(86) PCT No.: PCT/US2004/013669

§ 371 (c)(1),
(2), (4) Date: Sep. 26, 2006

(87) PCT Pub. No.: WO2004/099090

PCT Pub. Date: Nov. 18, 2004

(65) Prior Publication Data

US 2007/0062868 A1    Mar. 22, 2007

Related U.S. Application Data

(60) Provisional application No. 60/466,794, filed on May 1, 2003.

(51) Int. Cl.
*C02F 3/00* (2006.01)
*B01D 29/00* (2006.01)

(52) U.S. Cl. .................... 210/605; 210/610; 210/198.1; 210/295; 210/903

(58) Field of Classification Search ......... 210/610–611, 210/605, 903, 295, 198.1
See application file for complete search history.

(56) References Cited

U.S. PATENT DOCUMENTS 4,267,038 A * 5/1981 Thompson .................. 210/602

\* cited by examiner

*Primary Examiner*—Chester T Barry
(74) *Attorney, Agent, or Firm*—D'Ambrosio & Associates, PLLC; Jo Katherine D'Ambrosio

(57) ABSTRACT

A system (10) comprising multiple units (40a-40h) and method for filtration of wastewater (20) is disclosed. Simultaneous denitrification of a single filter unit and normal filtration of the remaining filter units is provided for. Separate flow control systems (36) are described.

25 Claims, 2 Drawing Sheets

METHOD AND SYSTEM FOR FILTRATION OF WASTEWATER

This application is the U.S. National Stage Application under 35 U.S.C. 371 of PCT Application No. PCT/US2004/013669 filed 29 Apr. 2004 and published 18 Nov. 2004 under International Publication No. WO 2004/099090. This application claims benefit of U.S. Provisional Application No. 60/466,794 filed 01 May 2003 and PCT Application No. PCT/US2004/013669.

BACKGROUND OF THE INVENTION

1. Field of the Invention

The present invention relates generally to the field of wastewater treatment. More specifically, the present invention relates to a method and system for controlling filtration wastewater treatment plants. Yet more specifically, the present invention relates to a method and system for controlling wastewater treatment filtration to provide selective denitrification of at least one of the filter units of the filtration system. The present invention further relates to a method of selectively denitrifying at least one of the filters of a wastewater filtration system while simultaneously operating the remainder of the filtration system in the normal filtration mode.

2. Description of Related Art

The filtration systems used in conjunction with wastewater treatment typically comprise a reservoir or channel where the wastewater is retained prior to being treated. The wastewater can flow from the channel over a weir into a bank of filters that are generally located adjacent the channel. The filter units are designed to filter out and capture the waste from the wastewater and each filter unit usually is comprised of a large vessel containing one or more layers of filtration media. The filtration media usually consists of layers of particles where the particle diameter varies with each successive layer. The normal filtration mode involves pouring the wastewater into the filter unit, passing the wastewater through the layer(s) of filter media, and subsequently drawing out the treated water from the bottom of the filter unit. It is the intent that the layers of filter media capture and contain the waste from the wastewater and discharge clean/treated water from the bottom of the filter unit.

The primary function of the filter media during a normal filtering mode is to remove solid particles from the wastewater. Compounds other than solid particles however often reside in wastewater that need to be removed, such as nitrates and nitrites. These compounds can be removed from the wastewater by introducing microorganisms onto some or all layers of the filter media. These microorganisms should be capable of denitrifying the wastewater by converting the nitrates and nitrites within the wastewater into diatomic molecules, such as oxygen and nitrogen. Denitrification with microorganisms requires the addition of a conversion agent, a carbon source for example, to the wastewater as well as reducing the magnitude of the wastewater flow through the filter.

The current practice in operating filtration systems requires that, during the denitrification mode, the conversion agent is added to the entire flow of wastewater being fed to the filtration system. Thus all filters within the filtration system go into the denitrification mode. Conversion agents such as methanol are costly. Sending all filters into a denitrification phase even though only few filters require it drives up the cost of the conversion agent.

Another problem with current practice occurs when a filtration system is being denitrified, that is that the entire wastewater flow rate can be reduced in order for denitrification to take place, thereby reducing the filtration capacity for the entire filter system during this phase. In some instances though, such as during a storm surge, the flow rate of the wastewater being treated cannot be reduced, and therefore if a particular filter unit within a filtration system requires denitrification, it must wait until wastewater demand flow rate is not at a peak level. Therefore, there exists a need for performing denitrification of a filtration system without noticeably affecting the wastewater treatment throughout the entire filtration system.

SUMMARY OF THE INVENTION

The method and system of the present invention enables a multiple filter system to perform partial denitrification. In a method for the filtration of wastewater using a system with multiple filters, one or more of the filters can selectively be chosen for denitrification when required while allowing the remaining filters of the system to remain in filtration mode. Advantageously, each filter within the system has its own filter inlet so that the carbon source is delivered to the individual filter inlets requiring denitrification. Since the denitrification mode often requires a slower flow rate, another benefit of this improved method and system is that each filter has its own individual influent flow control to allow for different rates of flow to be delivered to the filters that are in the denitrification mode.

One preferred method for filtration of wastewater within a multi-mode filtration system comprising multiple filter units, the method comprises the following steps:

a. selecting one or more filter units to operate in a denitrification mode;
b. adjusting the influent flow rate of the one or more filter units selected in step (a) for denitrification operation;
c. pumping a carbon source to the one or more filter units selected in step (a);
d. adjusting the influent flow rate for the filter units in the filtration-only mode;
e. operating the filter units selected in step (a) in denitrification mode until desired $NO_x$—N level is attained; and
f. operating the remaining filter units in a filtration-only mode.

In this preferred method, the influent flow rate for the denitrification operation in step (b) and the influent flow rate for the filtration-only operation are adjusted by use of one or more separate valve systems for each filter unit. Each valve system preferably comprises two or more flow control valves. Alternatively, the valve system can comprise one or more proportioning valves. In still another alternative method, the valve system comprises a hydraulic flow control. Preferably, the flow rate of the carbon source is adjusted by a solenoid valve.

One preferred multi-mode filtration system comprises two or more filter units, each unit capable of operating in either a filtration mode or a denitrification mode. Each filter unit of the two or more filter units has a separate influent flow and a separate flow control system. Preferably, a carbon source pump and piping for directing the carbon source to the two or more filter units as needed is provided. The piping includes a separate feed pipe for each filter unit so that the carbon source is fed only to the filter units selected for operating in the denitrification mode. This preferred system further comprises an influent pipe for containing the influent flow for each filter unit. Alternatively, the system can utilize an influent channel to contain the influent flow for each filter unit. An influent chamber is used to contain the carbon source for each filter unit prior to sending to the unit.

DETAILED DESCRIPTION OF THE INVENTION

The present invention is directed to a method for wastewater treatment and a control system for a wastewater filter having multiple filter units that allows one or more selected filter units to be operated in denitrification mode. Advantageously, one or more of the filter units can operate in a denitrification mode to reduce the $NO_x$—N content of the unit to an acceptable level while the remaining units remain in filtration mode. The entire system does not have to be shut down for denitrification to occur.

The denitrification mode requires an inflow of a carbon source to feed microorganisms as well as a reduced wastewater influent flow rate. Having a filter system wherein one or more filter units operate in denitrification mode while the other units remain in filtration mode is achieved by the use of a control system that directs a separate stream of carbon source to each individual filter unit. In addition, each filter unit is provided with it's own separate influent flow so that the flow rate for each unit can be set for that particular unit. Beneficially, the method and system of this invention allows partial denitrification. Partial denitrification is useful when the amount of allowable $NO_x$—N is greater than 1 ppm (mg/l).

Denitrification kinetics favor partial denitrification, because of the benefits of reduced carbon consumption and reduced biosolids generation. Partial denitrification reduces consumption of the carbon source, reduces biosolids generation and allows for increased filtration flows since filtration within the entire filter system does not cease when one or two filters require denitrification. However, partial denitrification can lead to buildup of nitrites that can cause permit compliance problems if there is a stringent TN (total nitrogen) effluent limit, or if there is chlorination downstream of denitrification filter units. Nitrites resulting from partial denitrification can cause a 5:1 chlorine demand that can significantly increase chlorination costs.

Advantageously, the method and system of this invention perform denitrification in a manner that allows for all of the benefits of partial denitrification, but without the penalty of nitrite buildup.

Figure 1:
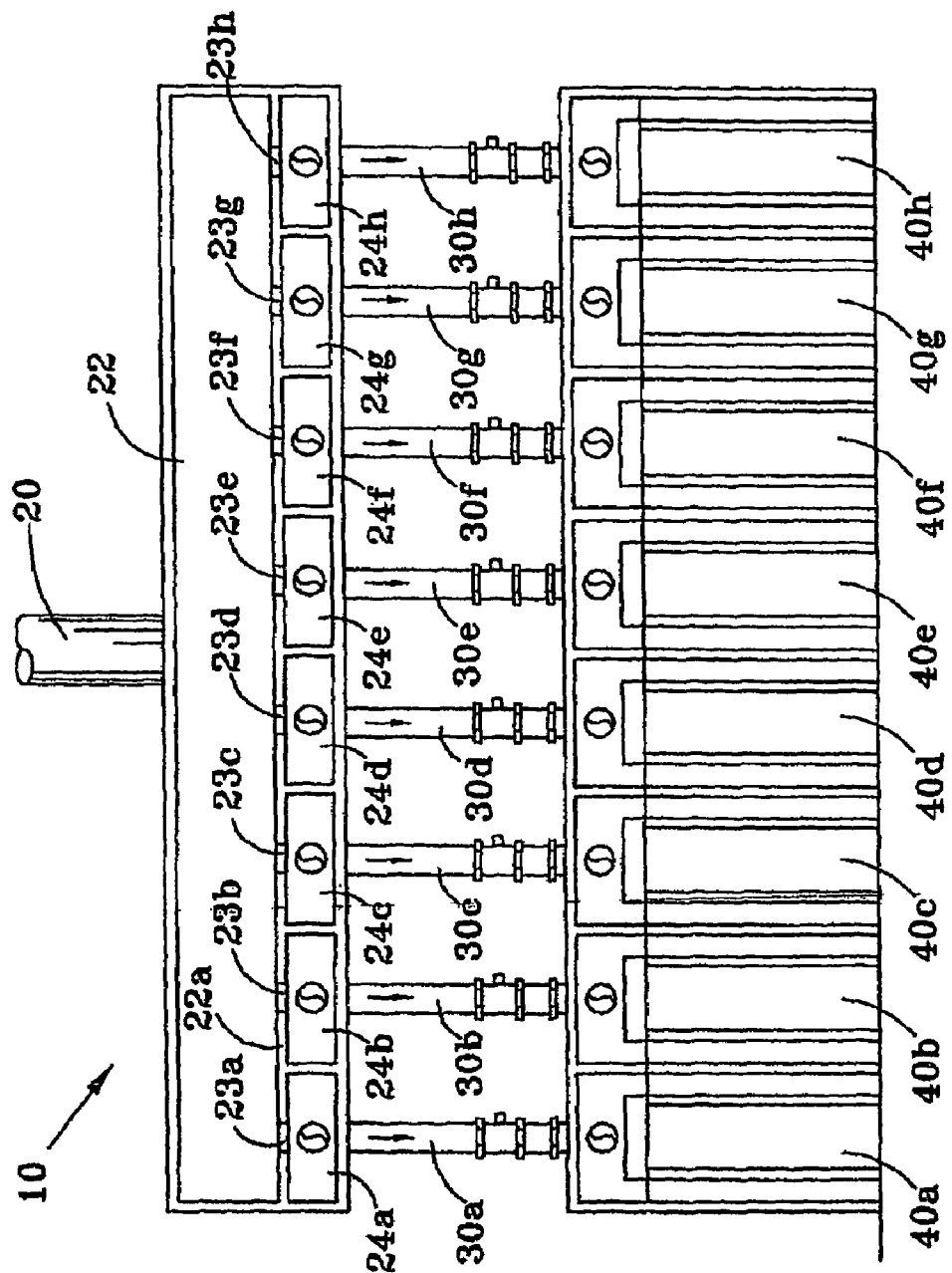
FIG. 1 depicts an overhead schematic view of one embodiment of a filtration system of the present invention.
Figure 2:
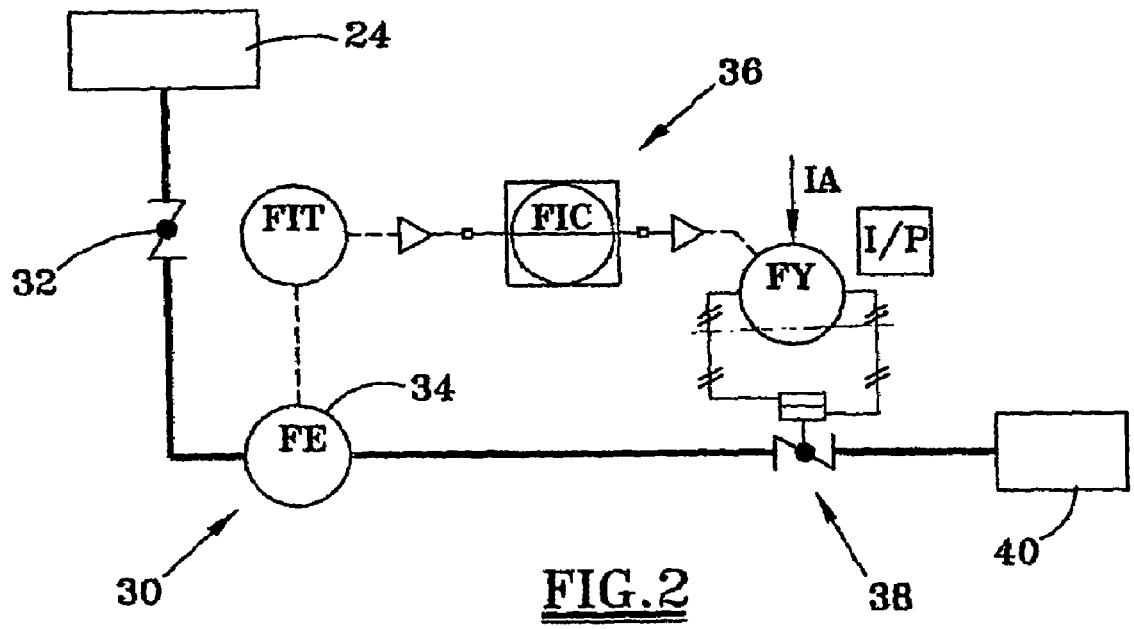
FIG. 2 illustrates a flow control scheme that can be included with one embodiment of the present invention.

With reference to the drawing herein, one embodiment of a filtration system 10 of the present invention is shown in FIG. 1. This embodiment of the filtration system 10 comprises a wastewater influent line 20, an influent channel 22, a filter influent channels 24a-24h, at least one filter 40, and filter influent piping 30a-30h connecting the filter influent channels 24a-24h to the at least one filter 40. Wastewater is delivered to the influent channel 22 via the wastewater influent line 20. Possible sources of wastewater are municipal sewer systems, process industries, chemical plants or manufacturing plants. The influent channel 22 as shown is a trough-like vessel, that is open at the top, and functions as a manifold to evenly distribute wastewater received from the wastewater influent 20 to each of the filter influent channels 24. While the shape, dimensions, and type of the influent channel 22 can take any now known or later developed form, the influent channel 22 should be of sufficient size and capability to be able to distribute wastewater to each of the filter influent channels 24. Further, the type or form of the wastewater influent carrier 20 is not critical to the invention, but can take any one of a number of forms, such as a pipe, conduit, elongated trough, or any other apparatus capable of transmitting fluid from one location to another.

Separating the influent channel 22 from the filter influent channels 24a-24h is the influent channel wall 22a. Slots 23a-23h are formed within the influent channel wall 22a preferably adjacent each filter influent channels 24a-24h. Wastewater from the influent channel 22 can flow through the slots 23a-23h into the filter influent channels 24a-24h. Since flow from the filter influent channels 24a-24h back to the influent channel 22 should not be allowed to occur, it is important that the bottom of the slots 23a-23h not extend below the level of the fluid contained within the filter influent channels 24a-24h.

The filter influent piping 30a-30h connects the filter influent channels 24a-24h to the filter unit 40 and provides a conduit for wastewater within the filter influent channels 24a-24h to flow to the filter unit 40. Each filter unit 40 comprises it's own filter influent channel, and filter influent piping. Included with each filter influent piping 30a-30h are one or more shut off valves 32, a flow element 34, and a control valve 38 for that specific filter unit. The one or more shut off valves 32 are within the filter influent piping 30a-30h and allow the operator to reduce or block off fluid flow through the filter influent piping 30a-30h and thereby isolate the filter unit 40 from the filter influent channels 24a-24h for denitrification or maintenance where it is desired or required to reduce or preclude fluid flow through the filter influent piping 30a-30h. For example in a system comprising two shut off valves, one can be turned off and the other left on to reduce the flow by half. In one embodiment, the flow control element is a magmeter. The control valves can be different types of valves known in the art, a butterfly valve for example.

In one preferred embodiment, the control valve 38, in combination with the flow element 34 and the flow control 36, can regulate the amount of fluid flow through the filter influent piping 30a-30h. As is well known, the control valve 38 opens, closes, or maintains its position in response to the fluid flow rate measured by the flow element 34. Signals representing fluid flow measured by the flow element 34 are fed to the control scheme 36. The control scheme 36 processes the signal obtained by the flow element 34 and forwards a corresponding signal to the control valve 38. Based on the signal received by the control valve 38, it will adjust accordingly thereby providing the desired flow through the filter influent piping 30a-30h. It is believed that those skilled in the art can without undue experimentation, readily implement the proper flow element 34, flow scheme 36, and control valve 38 in order to achieve the desired flow rate through the filter influent piping 30a-30h.

In an alternate embodiment, the influent flow is controlled by a proportioning valve or a positioning valve.

Figure 3:
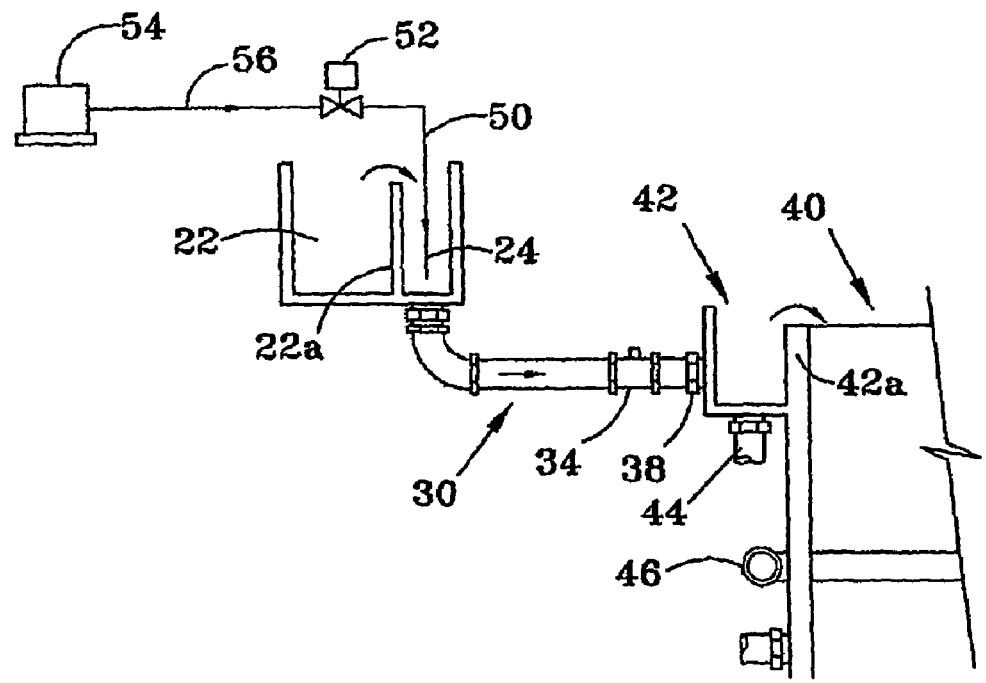
FIG. 3 portrays a partial cutaway side view of a fluid influent scheme of one embodiment of the present invention.

Also well known, microorganisms within the filter 40 provide the advantageous effect of converting nitrates and nitrites (NOx—N) into innocuous diatomic molecules such as oxygen and nitrogen. The conversion process of converting nitrates and nitrites into nitrogen and oxygen is also known as denitrification. Typically, this process requires the addition of a conversion agent such as a carbon source. Examples of carbon sources capable of working with microorganisms within the filter unit 40 for denitrification are methanol, ethanol, acetic acid, brewery wastes, sugars, primary effluent, and combinations of these. As shown in FIG. 3, a specific example of the present invention comprises mixing a conversion agent with the wastewater inside of a filter influent channels 24a-24h. In the example portrayed in FIG. 3, the conversion agent is conveyed to the filter influent channels 24a-24h by pump 54 via the conversion agent piping 56. While it is preferred that the pump 54 be a metering pump, the pump 54 can be any type of fluid transfer device capable of providing the appropriate amount of conversion agent to the filter influent channels 24a-24h. An on/off valve 52, such as a solenoid valve, is provided within the conversion agent piping 56 to initiate or cease conversion agent flow into the filter influent channels 24a-24h.

Also included with the present invention are a dirty backwash line 44 and a backwash air line 46.

In the embodiment of the filtration system 10 illustrated in FIG. 1, each filter unit 40 has dedicated filter influent piping 30a-30h and a filter influent channels 24a-24h. The number of individual filter unit 40 included with the filtration system 10 can vary from the number depicted herein and is not critical to the present invention. However, it is important that each filter unit 40 have the capability through its dedicated filter influent piping 30a-30h and filter influent channels 24a-24h to be isolated from the other filter unit 40 of the same filtration system 10, so that denitrification and filtration can occur simultaneously within the same filter system 10.

It should be noted that once the wastewater from the influent channel 22 flows into one of the filter effluent channels 24; the fluid within each of the filter effluent channels 24 is precluded from flowing to or mixing with fluid in the influent channel 22 or with fluid in any of the other filter effluent channels 24 of the filtration system 10. This feature isolates the wastewater within each of the filter effluent channels 24 and the wastewater within the particular filter effluent channels 24a-24h can only flow onto the filter unit 40 connected to that particular filter effluent channels 24a-24h. Isolating each filter effluent channels 24a-24h from the other channels allows for the selective denitrification of at least one particular filter unit 40 while the remaining filter units of the filtration system 40 continue in their normal filtration mode. This is particularly advantageous since the filtration system 10 can continue to operate and treat wastewater in the normal filtration mode while at least one filter unit 40 of the filtration system 10 is subjected to the denitrification process.

In operation, upon the determination that the denitrification of at least one filter unit 40 is required, the filter units 40 to be denitrified are selected. A metering pump 54 is activated and the conversion agent or carbon sources pumped into the influent channels 24a-24h of the selected filters. Carbon sources used to feed the filter microorganisms are chosen from methanol, ethanol, acetic acid, brewery wastes, sugars, primary effluents and combinations thereof. During the filtration process, the treated wastewater stream is tested periodically for $NO_x$—N levels. In one embodiment of the present invention, nitrate analysis can be performed for each individual filter effluent. Alternatively, the individual filter effluent nitrated is calculated based upon the combined effluent analysis and number of filters in denitrification mode. Denitrification is indicated when the $NO_x$—N levels are above permit requirements. Either the filter system operator or an automatic control system will select one or more particular filter units for denitrification.

The flow of the conversion agent to the selected filter units is activated as described above.

The amount of conversion agent added to the waste water depends upon many factors, such as the type of conversion agent used, the flow rate of the wastewater the conversion agent is being mixed with, and the type of microorganism used to denitrify the wastewater. However, it is believed that those skilled in the art can readily ascertain the proper amount of conversion agent to be added to the wastewater without undue experimentation.

At the same time that the carbon source enters the selected filter units influent flow, wastewater from the influent channel 22 continues to flow over a first weir 22a into the filter influent channels 24a-24h of the selected filter units.

Within the filter influent channels 24a-24h the conversion agent or conversion agent-clean water mixture is mixed with the wastewater and the resulting mixture is transferred to the filter channel 42. The influent flow rate to the selected filter unit(s) is reduced. The denitrification influent flow can vary and is known in the art. Typically, the flow rate of fluid through the filter influent piping 30a-30h is reduced during the denitrification process. However, under certain conditions, the flow rate can remain the same, depending on the denitrification loading relative to the TSS (total suspended solids) and particle size distribution. In a non-limiting example, during the normal filtration mode, the flow rate through the filter influent piping 30a-30h is approximately 8 gallons/min/ft$^2$ (328.98 L/min/m$^2$) whereas in a denitrification mode the flow rate is reduced to approximately 2.6 gallons/min/ft$^2$ (106.92 L/min/m$^2$.) After flowing to the filter channel 42, the wastewater-methanol mixture accumulates and rises before flowing over a second weir 42a into the filter unit 40. The denitrification phase continues until samples of treated wastewater indicate acceptable $NO_x$—N levels. As described above, conveying the mixture of wastewater and conversion agent to the filter media containing the microorganisms initiates the denitrifying process. Furthermore, the present invention enables selective denitrification of at least one specific filter 40 within the filtration system 10 while simultaneously operating some or all of the remaining filters in the filtration mode (the remaining filters do not receive the conversion agent nor is the flow rate to these filters reduced.) This method provides the flexibility to continuously filter wastewater during a denitrification process, even during critical times such as peak wastewater operating loads, storm events, or phosphorus removal since the entire filter system does not have to be shut down or taken out of filtration mode.

It is important that the conversion agent mix well with the wastewater before the mixture is introduced into the filter unit 40. To ensure proper mixing of the wastewater with the conversion agent, in one embodiment of the invention, the length of the filter influent piping 30a-30h can be extended and additional piping elbows can be added to this piping segment. Further, static mixers can be included within the filter influent piping 30a-30h to produce fluid flow turbulence thereby enhancing the mixing of the wastewater with the conversion agent.

In one embodiment of this invention, the carbon source is diluted with clean water prior to changing to the filter unit(s) selected for denitrification. The clean water is piped to the filter unit in a separate carrier pipe. The carbon source is injected some distance from the filter unit to allow the carbon source to mix thoroughly with the clean water as it goes through the pipe. A 50-50 clean water-carbon source is typical.

Alternatively, the carbon source is added directly to the filter influent flow immediately prior to entering the filter unit.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method for filtration of wastewater within a filtration system comprising multiple filter units, the method comprising:
   a. operating fewer than all units within the filtration system in a filtration-only mode; and
   b. simultaneously operating the remaining units in a denitrification mode.

2. A method for filtration of wastewater within a filtration system comprising multiple filter units, the method comprising:
   a. selecting one or more filter units to operate in a denitrification mode;
   b. pumping a carbon source to the one or more filter units selected in step (a);
   c. operating the filter units selected in step (a) in denitrification mode until a desired $NO_x$—N level is attained; and
   d. operating the remaining filter units in a filtration-only mode.

3. The method for filtration of claim 2 wherein the flow rate of the carbon source to the one or more filter units is activated by a valve.

4. A method for filtration of wastewater within a filtration system comprising multiple filter units, the method comprising:
   a. selecting one or more filter units to operate in a denitrification mode, each filter unit of the filtration system comprising a separate influent flow conduit;
   b. charging a carbon source to each influent flow entering the filter units selected in step (a);
   c. operating the filter units selected in step (a) in denitrification mode until a desired NOX—N level is attained; and
   d. operating the remaining filter units in a filtration-only mode.

5. The method of claim 4 wherein the influent flow conduit to each filter unit is an influent pipe.

6. The method of claim 4 wherein the influent flow conduit to each filter unit is an influent channel.

7. The method of claim 4 wherein the carbon source to each filter unit is directed to an influent chamber prior to entering the influent flow pipe.

8. The method of claim 4 wherein the carbon source is selected from the group consisting of methanol, ethanol, acetic acid, brewery wastes, sugars, primary effluent and combinations thereof.

9. The method of claim 4 wherein the carbon source is diluted with clean water prior to charging the carbon source to the influent flows of the one or more filter units selected in step (a).

10. The method of claim 9 wherein the carbon source is injected directly into a clean water pipe, thoroughly mixed with clean water and diverted into each influent flow for the filter units selected in step (a).

11. The method of claim 4 wherein the carbon source is injected directly into influent flows entering the filter units selected in step (a).

12. A method for filtration of wastewater within a multi-mode filtration system comprising multiple filter units, the method comprising:
   a. selecting one or more filter units to operate in a denitrification mode;
   b. adjusting the influent flow rate of the one or more filter units selected in step (a) for denitrification operation;
   c. pumping a carbon source to the one or more filter units selected in step (a);
   d. operating the remaining filter units in a filtration-only mode; and
   e. operating the filter units selected in step (a) in denitrification mode until a desired $NO_x$—N level is attained.

13. A method for filtration of wastewater within a multi-mode filtration system comprising multiple filter units, the method comprising:
   a. selecting one or more filter units to operate in a denitrification mode;
   b. adjusting the influent flow rate of the one or more filter units selected in step (a) for denitrification operation;
   c. pumping a carbon source to the one or more filter units selected in step (a);
   d. adjusting the influent flow rate for the filter units in the filtration-only mode;
   e. operating the filter units selected in step (a) in denitrification mode until a desired $NO_x$—N level is attained; and
   f. operating the remaining filter units in a filtration-only mode.

14. The method of claim 13 wherein the influent flow rate for the denitrification operation in step (b) and the influent flow rate for the filtration-only operation are adjusted by use of one or more separate valve systems for each filter unit.

15. The method of claim 14 wherein each valve system comprises two or more flow control valves.

16. The method of claim 14 wherein the valve system comprises one or more proportioning valves.

17. The method of claim 14 wherein the valve system comprises a hydraulic flow control.

18. The method of claim 13 wherein the flow rate of the carbon source is adjusted by a solenoid valve.

19. A multi-mode filtration system comprising:
   two or more filter units, each unit capable of operating in either a filtration mode or a denitrification mode;
   each filter unit of the two or more filter units comprising a separate influent flow and a separate flow control system; and
   a carbon source pump and piping for directing the carbon source to the two or more filter units as needed, the piping including a separate feed pipe for each filter unit so that the carbon source is fed only to the filter units selected for operating in the denitrification mode.

20. The filtration system of claim 19 further comprising an influent pipe for containing the influent flow for each filter unit.

21. The filtration system of claim 19 further comprising an influent chamber for containing the carbon source for each filter unit.

22. A multi-mode filtration system comprising multiple filter units, the method comprising:
   two or more filter units capable of operating in either filtration mode or denitrification mode;
   each filter unit of the two or more filter units comprising a separate influent flow;
   each filter unit comprising a valve control system for regulating the influent flow to the filter unit; and a carbon source pump and piping capable of directing the carbon source directly to any one unit of the two or more filter units.

23. The filtration system of claim 22 wherein the valve control system for each filter unit comprises two or more flow control valves.

24. The filtration system of claim 22 wherein the valve control system comprises one or more proportioning valves.

25. The filtration system of claim 22 wherein the valve control system comprises a hydraulic flow control.

* * * * *